United States Patent [19]

Mizokami et al.

[11] Patent Number: 5,077,715
[45] Date of Patent: Dec. 31, 1991

[54] INFORMATION RECORDING AND REPRODUCING METHOD UTILIZING PARTICULAR SECTOR CONFIGURATION

[75] Inventors: Takuya Mizokami, Odawara; Kazuo Shigematsu, Saitama; Shinichi Arai, Odawara, all of Japan

[73] Assignee: Hitachi, Ltd., Tokyo, Japan

[21] Appl. No.: 584,122

[22] Filed: Sep. 18, 1990

[30] Foreign Application Priority Data

Sep. 20, 1989 [JP] Japan .................................. 1-245836

[51] Int. Cl.$^5$ ................................................ G11B 7/00
[52] U.S. Cl. .................................................... 369/32
[58] Field of Search ........................ 369/32, 34, 36, 56, 369/57, 58, 59, 67, 275.4; 360/48

[56] References Cited

U.S. PATENT DOCUMENTS 4,420,807 12/1983 Nolta et al. ...................... 364/200 X
4,535,439 10/1985 Satoh ............................ 369/275.4 X
4,814,903  3/1989 Kulakowski ...................... 369/59 X

FOREIGN PATENT DOCUMENTS

0040169  2/1990  Japan ..................................... 369/43

Primary Examiner—Robert L. Richardson
Attorney, Agent, or Firm—Kenyon & Kenyon

[57] ABSTRACT

In an information recording and reproducing apparatus for recording or reproducing information to/from tracks by irradiating a light spot to an optical disk in which N sectors are included per track and the number of necessary alternating sectors per track is set to M, the apparatus has a track format such that when a desired moving time of the light spot between the adjacent tracks is k times as long as a desired sector passing time of the light spot, M or more alterating sectors are arranged subsequent to the ordinary sectors to record user's data. The light spot jumps between the tracks for a period of time corresponding to k sectors. Thus, the recording of information to a certain track and the subsequent reading check (Read After Write) can be effectively executed at a high speed.

8 Claims, 11 Drawing Sheets

INFORMATION RECORDING AND REPRODUCING METHOD UTILIZING PARTICULAR SECTOR CONFIGURATION

BACKGROUND OF THE INVENTION

The present invention relates to an information recording and reproducing apparatus and, more particularly, to an optical disk apparatus and a track format on an optical disk medium which is used in such an apparatus.

As a kind of external memory apparatus in an information processing system or the like, for instance, an optical disk apparatus for optically recording/ reproducing information onto/from the surface of an optical disk as an information recording medium by irradiation of a laser spot or the like has been put into practical use as disclosed in the literature such as "Optical disk file apparatus of a large capacity in which code information became possible", Nikkei Electronics, pages 189 to 213, Nikkei BP Co., Ltd., Nov. 21, 1983, or the like.

As also disclosed in the above literature, in the optical disk, a possibility such that data errors occur is generally high as compared with the case of recording information to other recording media such as a magnetic disk. As a countermeasure for the occurrence of errors, a verification, that is, a read after write operation (hereinafter, referred to as an RAW operation) is executed by a method whereby just after information was written to the optical disk, the information is read out of the optical disk and collated with the information before it is written. Further, together with a plurality of user's sectors into which ordinary information is recorded, a predetermined number of alternating sectors are provided every track. When errors were detected in a user's sector by the RAW operation upon recording, similar original information is properly recorded into an alternating sector in the relevant track. Upon reproduction, the data in the user's sector having the errors is replaced by the data in the corresponding alternating sector.

Therefore, in the recording and reproducing operation of the information for the optical disk, a proper control including the RAW operation and the access to the alternating sector is inevitable. In the above literature, the multiplex recording and reproducing operations using a buffer memory are executed to realize ideal recording/reproducing operations such that the recording of the data of one track including the RAW operation is executed for a period of time of two rotations of the optical disk in the recording mode and that the reading-out operation of the data of one track is executed for a period of time of one rotation of the optical disk in the reproducing mode.

Figure 10:
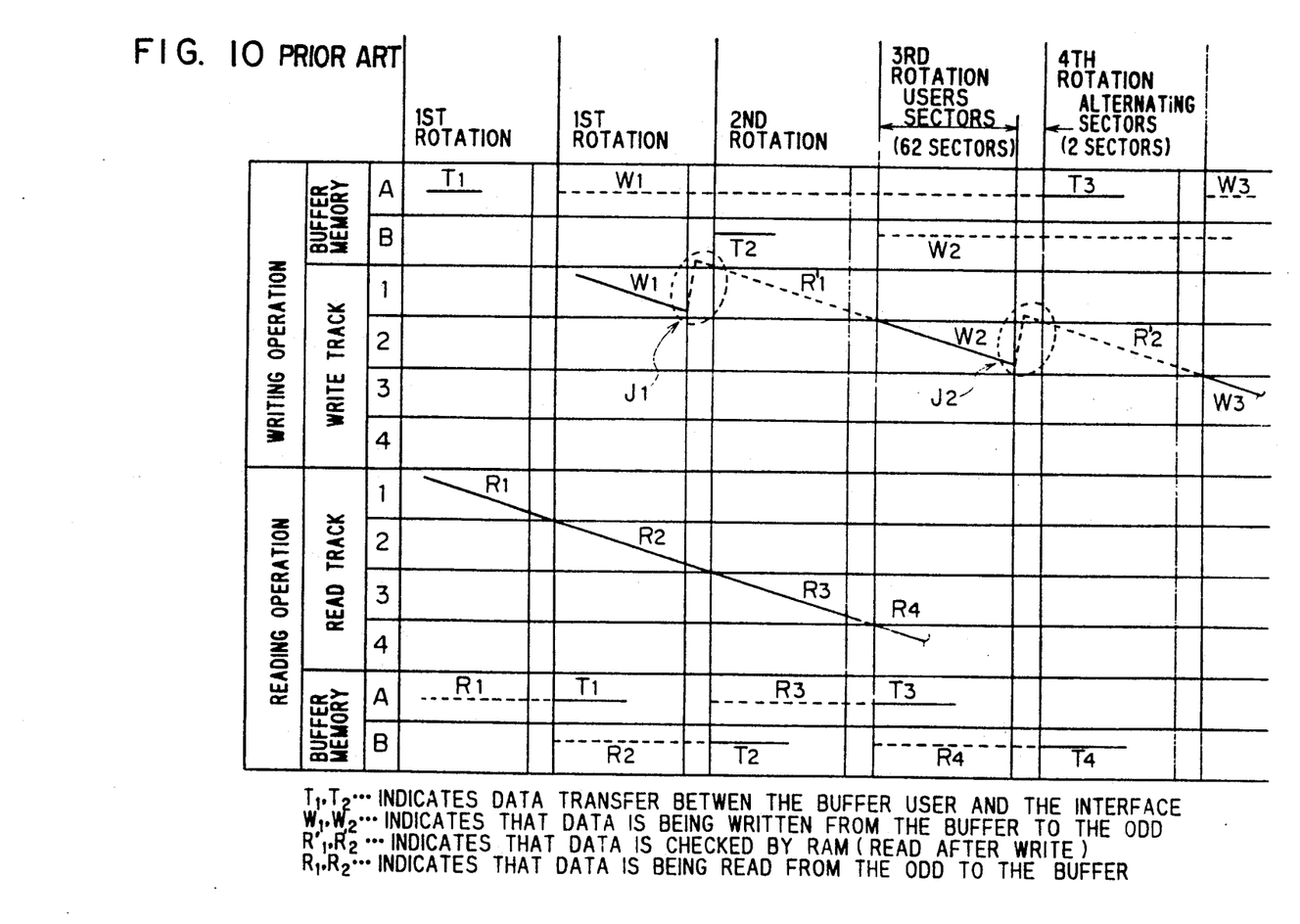
FIG. 10 is a diagram showing an example of the setting of a track format in the conventional technique and the writing and reading operations in such a track format.

A flowchart for the multiplex recording and reproducing operations has been disclosed at page 209 in the above literature and is shown in FIG. 10.

That is, as shown in FIG. 10, the number of sectors included in one track is set to 64. Among them, the number of user's sector is set to 62 and the number of alternating sectors is set to 2. On the other hand, two buffer memories each having a memory capacity of one track are provided. Transmission and reception of data with an upper system are executed through the buffer memories in accordance with a data transfer of on the upper apparatus.

The data from the upper apparatus is first stored into the buffer memory ($T_1$ in the diagram). The data in the buffer memory is recorded to a target track on the optical disk ($W_1$ in the diagram). A laser spot is jumped to the adjacent inside track in the first alternating sector in the rear portion of the track (such an operation is called a sector jump) $J_1$ in the diagram). Further, the recording data is verified by the RAW operation in the next rotation ($R_1'$ in the diagram). At this time, if the number of sectors which were determined to be unusable because of errors is one or less, the data to be written into the unusable sector is written into the second alternating sector in the relevant track. Subsequently, data $T_2$ is written to the next track ($W_2$ in the diagram). The laser spot is jumped to the adjacent inside track in the first alternating sector in the rear portion of the track ($J_2$ in the diagram). The RAW operation to the alternating sector of the preceding track and the RAW operation for the writing $W_2$ to the relevant track are executed ($R_2'$ in the diagram).

As mentioned above, if the occurrence rate of the erroneous sectors, i.e., alternating sectors in each track is equal to one sector/track, data of one track can be written by two rotations of the optical disk.

On the other hand, upon reproduction of data, the replacement of the data corresponding to the erroneous sector by the data of the alternating sector in the buffer memory can be executed without waiting for the rotation.

In the case of the above conventional technique, a condition such that the laser spot can be jumped to the track on the inner rim side within a desired passing time of one sector in the peripheral direction of the laser spot is used as a prerequisite.

However, there is a tendency such that the desired passing time of one sector by the laser spot is reduced by the improvement of the frequency characteristics of the recording/reproducing system or the like having an object to realize a high recording/reproducing speed of data or the like. On the other hand, in the present situation, a time of about 1 msec is required for the moving operation between tracks in the radial direction of the laser spot because such a moving operation ordinarily includes a mechanical operation.

Therefore, if the high recording/reproducing speed of data is improved and a desired passing time of one sector of the laser spot is shorter than the time which is required for the movement (track jump) between the adjacent tracks, in the case of the above conventional technique, there is a problem such that even if the error occurrence rate is equal to or less than one sector per track, it is impossible to realize the ideal writing operation such the data of one track is written for a period of time corresponding to two rotations of the optical disk including the RAW operation.

SUMMARY OF THE INVENTION

The present invention provides a solution to this problem, providing an information recording and reproducing apparatus which can effectively smoothly record or reproduce information even if a time which is required for a light spot to pass through a unit sector is shorter than a time which is required for the movement between adjacent tracks.

The present invention also provide an optical recording and reproducing apparatus in which information is recorded or reproduced in a manner such that a time which is required for a light spot to move to the adjacent track can be sufficiently absorbed.

The present invention further obtains a format of an optical disk having sectors serving as a dummy corresponding to a time which is required for a light spot to jump between tracks.

That is, the present invention achieves the desired solution by providing, an information recording and reproducing apparatus for recording or reproducing information to/from a track by irradiating a light spot to the track of a rotatable information recording medium such as an optical disk in which N sectors are included per track and the number of necessary alternating sectors per track is M. If a time which is required for the access means such as a light spot to move between the adjacent tracks is k (k>1) times as long as a time which is required for the light spot to pass through one sector, there is set a first track format such that M or more alternating sectors are arranged subsequently to (N−M−k) ordinary sectors. Each time the start position of the head sector of each track is shifted to the outer peripheral side by one track when it is seen from the radial direction of the rotatable information recording medium, the start position is deviated on a sector unit basis. In the case of writing data from the inner rim side track to the outer rim side track, by starting the track jump of one track to the inner rim side after completion of the writing operation of data to the (N−M−k) ordinary sectors in an arbitrary track, the track jump is finished for a desired time which is k times as long as the desired passing time of one sector. At this time point, the light spot is positioned just before the M alternating sectors of one track before.

Thus, it is possible to perform the RAW (Read After Write) operation to the ordinary sectors of the relevant track including M alternating sectors of the preceding track. The recording operation comprising the writing of data of one track and the RAW operation can be completed for a period of time of two rotations of the rotational type information recording medium. On the other hand, for the reproducing operation, by providing a buffer memory corresponding to a recording capacity of data of one track, the data in the erroneous sector portion in the reading mode can be replaced by the data of the alternating sectors for a period of time corresponding to one rotation of the rotational type information recording medium.

Further, in the case where the rotational type information recording medium has a recording format of an MCAV (Modified Constant Angular Velocity) type, a plurality of zones are formed on the recording medium. By setting the first track format every zone, the recording operation of the data of one track can be completed for a period of time corresponding to two rotations of the recording medium. The reproducing operation of the data of one track can be completed for a period of time of one rotation of the medium.

On the other hand, according to another practical embodiment of the invention, in the optical information recording and reproducing apparatus, if a time which is required for a light spot to move between the adjacent tracks is k (k>1) times as long as a time which is required for the light spot to pass through a certain sector, there is set a second track format such that (M+k) or more alternating sectors are arranged subsequent to (N−M−k) ordinary sectors. In addition to the M alternating sectors which are used when errors were detected in the ordinary sectors, k alternating sectors exist subsequent to the ordinary sectors in which data for the user is recorded. By starting the track jump after completion of the writing operation to the (N−M−k) ordinary sectors in an arbitrary track, the light spot finishes the jumping operation between tracks for a desired time which is k times as long as the desired passing time of one sector, that is, for a period of time of the rotating operation of the disk corresponding to the k alternating sectors among the (M+k) alternating sectors arranged subsequent to the ordinary sectors. At this time point, the light spot is positioned just before the M alternating sectors of one track before. That is, the k sectors function as a dummy for allowing the light spot to jump between tracks.

On the other hand, according to the rotational type information recording medium of the present invention, the medium has the first or second track format, and by setting the first or second track format every track in the case of the ordinary recording format or every zone in the case of a recording format of the MCAV type, it is possible to execute an ideal recording and reproducing operation such that the data of one track is recorded for a period of time corresponding to two rotations of the medium and that the data of one track is reproduced for a period of time of one rotation of the medium.

DETAILED DESCRIPTION

Explanation will now be made in detail hereinbelow with reference to the drawings with respect to an embodiment in the case where the invention was applied to an optical disk apparatus.

Figure 1:
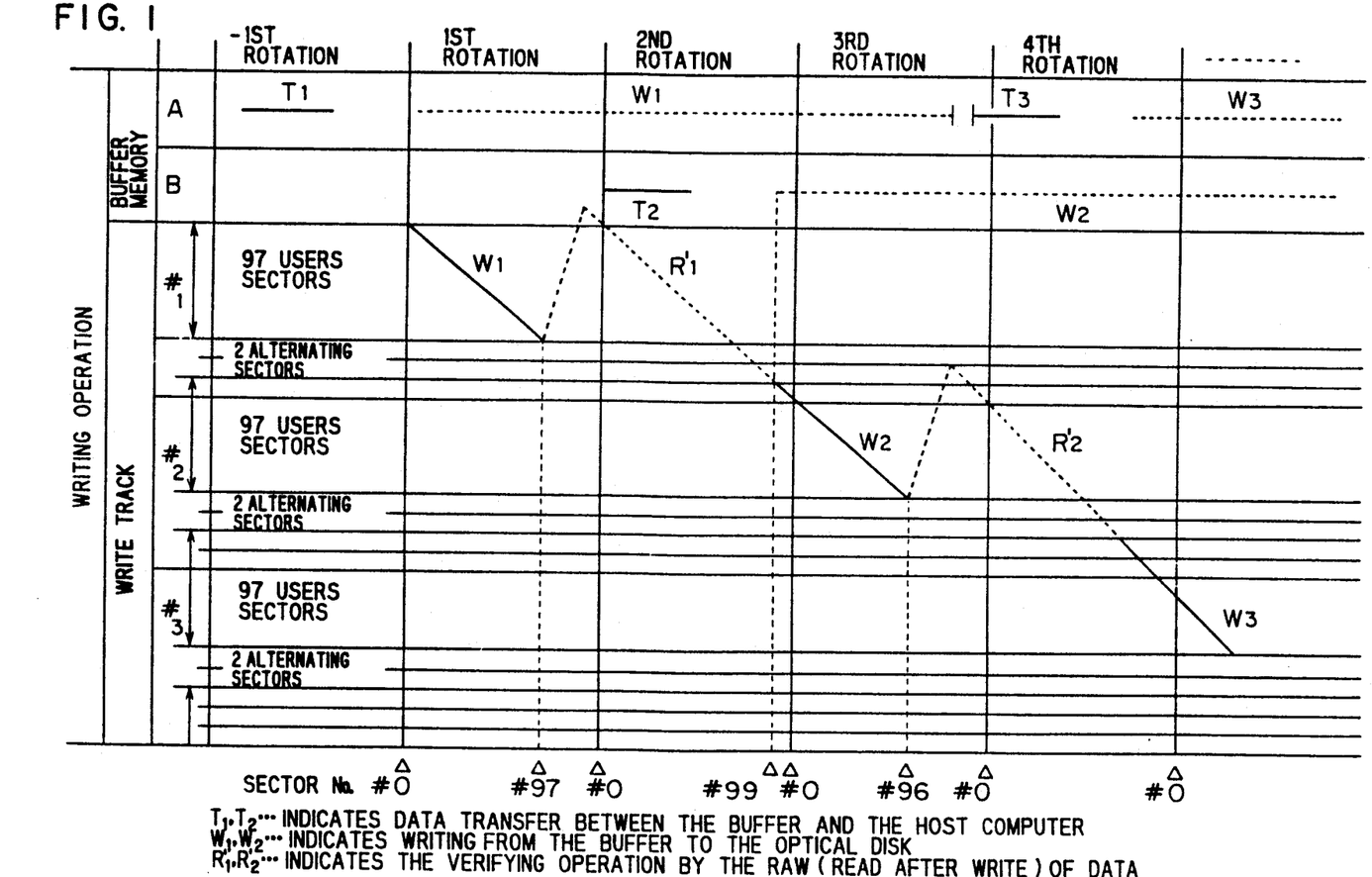
FIG. 1 is a diagram showing an example of the writing operation in a first track format in an optical disk apparatus of the embodiment 1 according to the present invention.
Figure 2:
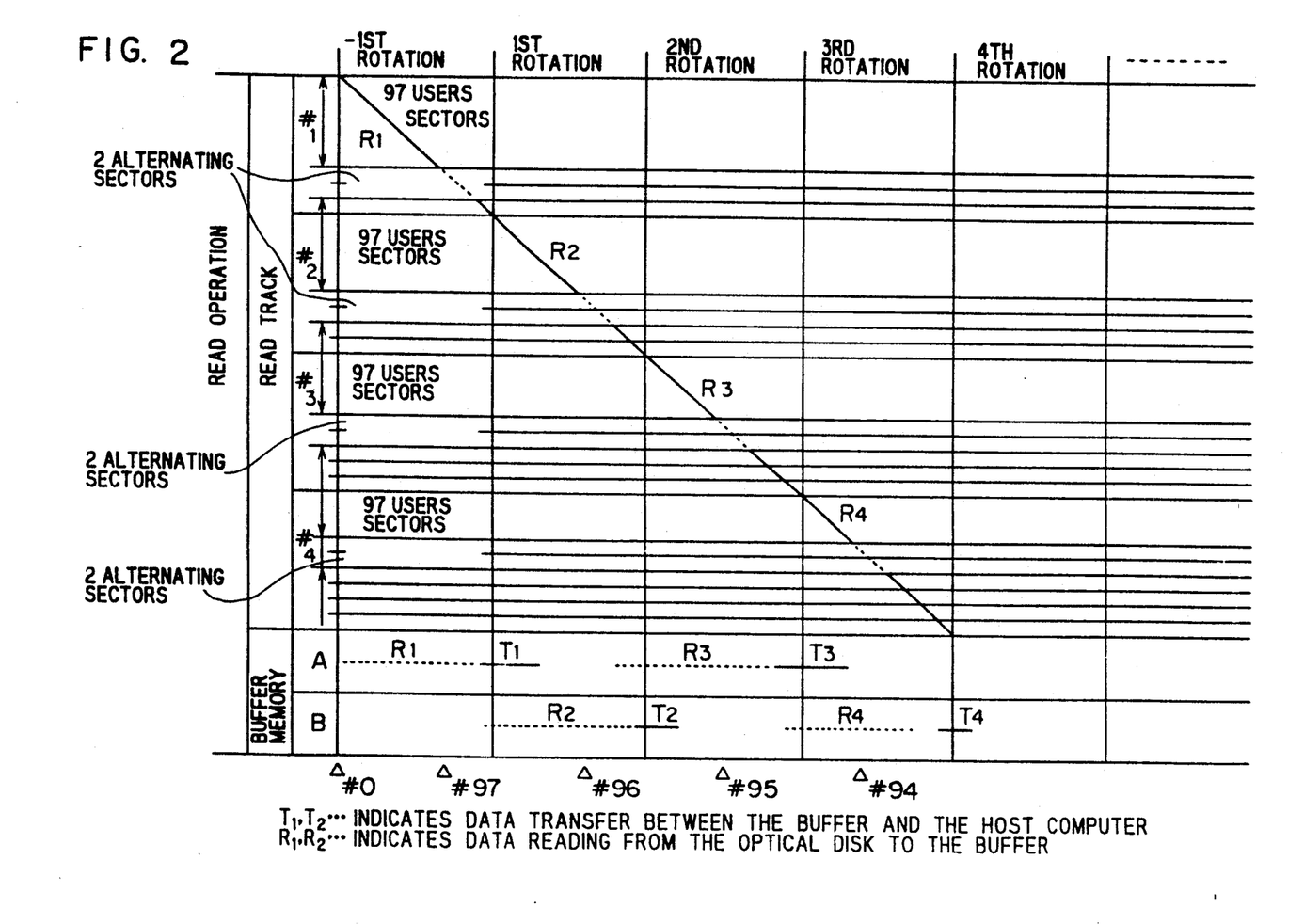
FIG. 2 is a diagram showing an example of the reading operation in the first track format in the optical disk apparatus of the embodiment of FIG. 1.

FIGS. 1 and 2 are explanatory diagrams showing an example of the writing and reading operations in the optical disk apparatus of the embodiment, respectively.

Figure 3:
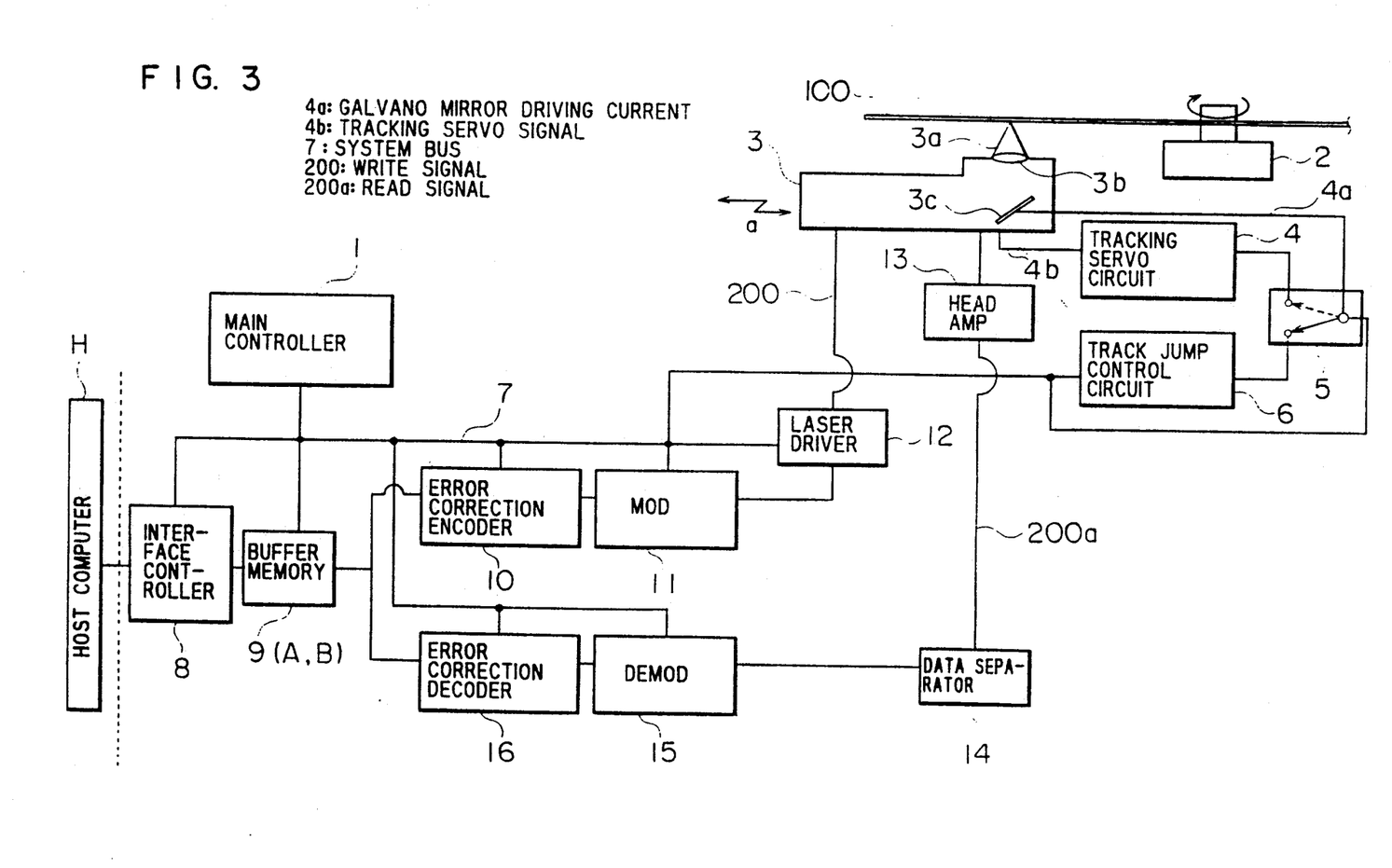
FIG. 3 is a block diagram showing an example of a construction of the optical disk apparatus in the embodiment 1 of FIG. 1.
Figure 4:
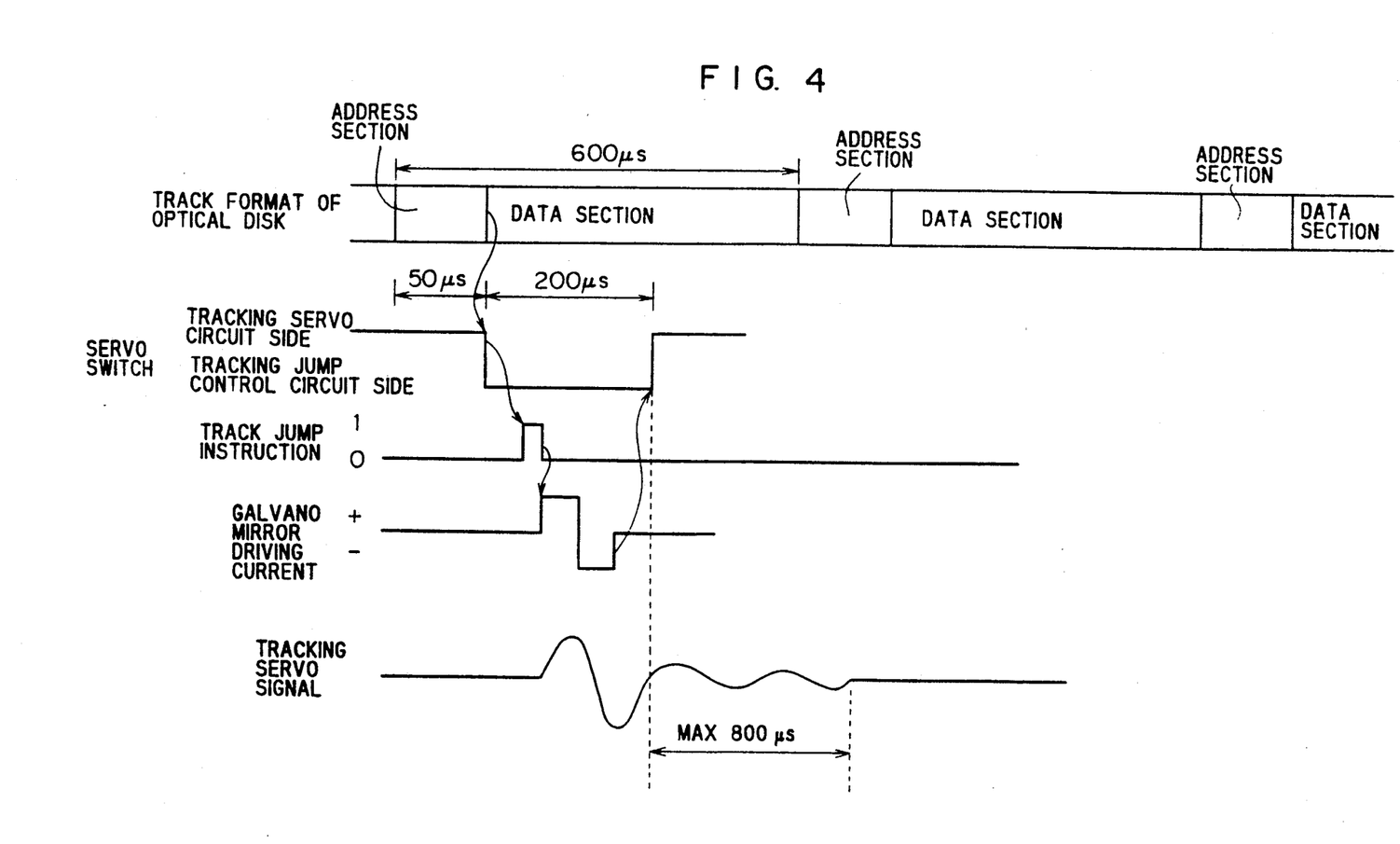
FIG. 4 is a timing chart showing an example of the control operation.

FIG. 3 is a block diagram showing an example of a construction of the optical disk apparatus in the embodiment. FIG. 4 is a timing chart showing an example of the control operation of the optical disk apparatus.

The outline of the construction of the optical disk apparatus in the embodiment will be first described with reference to FIG. 3.

The optical disk apparatus of the embodiment has a main controller 1 which comprises, for instance, a microprocessor and integratedly controls the whole apparatus. An optical disk 100 which is detachably attached to a spindle is rotated at a predetermined rotational speed such as 1000 r.p.m. by a driving mechanism 2 such as a motor. A laser spot 3a is irradiated from an optical head 3 to the optical disk 100, thereby executing the recording/reproducing operation of information.

In the case of the embodiment, for instance, a plurality of tracks are spirally formed on the optical disk 100 and a certain track is divided into, e.g., 100 (=N) sectors. When writing data into the individual sectors which belong to a certain track, if errors are detected in a certain sector, the data is written into an alternating sector in place of such an erroneous sector. It is assumed that the number of alternating sectors which are required per track is set to one (=M). That is, in the case of the embodiment, the values of N and M are set to 100 and 1, respectively.

As shown in FIG. 4, each sector is constructed by an address section in which information such as track number, sector number, and the like to specify the location of a certain sector in a certain track on the optical disk 100 has previously been recorded and a data section in which ordinary user's data is recorded.

In the case of the embodiment, the track numbers #1, #2, #3, ... are given to the respective tracks in accordance with the ascending order in the writing direction from the inner rim side to the outer rim side. The sector numbers #1, #2, #3, ... are also given to the sectors which belong to the respective tracks in accordance with the ascending order in the writing direction.

In FIG. 3, the optical head 3 is provided with an optical system comprising: a group of lenses 3b to converge the laser spot 3a onto the optical disk 100; a galvano mirror 3c for finely adjusting the irradiating position of the laser spot 3a to the optical disk 100; and the like. On the other hand, the optical head 3 is moved in the radial direction "a" of the optical disk 100 by a driving mechanism (not shown).

A tracking servo circuit 4 detects a tracking servo signal 4b to which the deviation of the optical head 3 is accurately reflected. A closed loop control in which a whole mechanical deviation of the optical head 3 and a fine movement of an optical axis of the laser spot 3a through the galvano mirror 3c by the adjustment of a galvano mirror driving current 4a are properly combined is executed by the tracking servo circuit 4. Thus, the tracing operation to the tracks which were, for instance, spirally formed on the surface of the optical disk 100 is executed.

In the case of this embodiment, in the tracing operation of the laser spot 3a to the track, a desired sector passing time which is required for the laser spot to pass through one sector in the track is equal to 600μ sec because the rotational speed of the optical disk 100 is set to 1000 r.p.m. and the number of sectors in one track is set to 100.

A track jump control circuit 6 is connected through a servo switch 5 to the closed loop of the driving current 4a of the galvano mirror of the tracking servo circuit 4. By switching the servo switch 5 to the side of the track jump control circuit 6 and by giving a predetermined galvano mirror driving current 4a from the track jump control circuit 6, the jumping operation between tracks in the radial direction is executed as will be explained below.

The track jump control circuit 6 and the servo switch 5 operate under the control of the main controller 1 through a system bus 7. The track jumping operation is performed by an instruction from the main controller 1.

On the other hand, an interface controller 8 to control the transmission and reception of information with an upper host computer H and a buffer memory 9 in which data which is transmitted and received with the host computer H are stored are connected to the main controller 1 through the system bus 7. The buffer memory 9 comprises memory areas A and B each of which has a memory capacity of one track and can independently execute the inputting/outputting operations. An error correction encoder 10, a modulator 11, and a laser driver 12 are connected to the buffer memory 9. The error correction encoder 10 operates under the control of the main controller 1 through the system bus 7 and adds error correction information to the write data sent from the buffer memory 9 in accordance with a predetermined algorithm. The modulator 11 modulates the combination of the data and the error correction information into a write signal 200. The laser driver 12 drives a laser light source or the like (not shown) provided in the optical head 3 in accordance with the write signal 200 which is sent from the modulator 11, thereby allowing the recording operation of data to the optical disk 100 to be executed.

Between the optical head 3 and the buffer memory 9, there are provided: a head amplifier 13 to amplify a read signal 200a from the optical disk 100; a data separator 14 to separate the necessary portion from the read signal 200a; a demodulator 15 to demodulate the read signal 200a; and an error correction decoder 16 to eliminate error correction information from the demodulated data. The demodulator 15 and the error correction decoder 16 operate under the control of the main controller 1 through the system bus 7.

Due to this, the storage of the ordinary read data into the buffer memory 9, the reference of a position information signal in the optical disk 100 by the main controller 1, and the like are executed.

An example of the general operation of the optical disk apparatus with the above construction will now be described hereinbelow.

When a data write command is generated from the upper host computer H, the interface controller 8 informs the generation of the write command to the main controller 1 through the system bus 7. In response to the write command, the main controller 1 allows the buffer memory 9 to hold the data which is transmitted from the host computer H through the interface controller 8.

Further, the main controller 1 reads position information on the optical disk 100, that is, address information and the like in each sector from the demodulator 15 through the head amplifier 13 and data separator 14. On the basis of the position information, the optical head 3 is positioned to a special track and a special sector which were designated from the host computer H. The data which was read out of the buffer memory 9 is sent to the laser driver 12 through the error correction encoder 10 and the modulator 11. By giving an output signal from the laser driver 12 to a laser light source (not shown) as a write signal 200 and by properly changing the intensity of the output of the laser spot 3a in accordance with, for instance, the level of the write signal, the data is written to the optical disk 100.

On the other hand, for verification (RAW operation) by the reading and collation of the write data, the laser spot 3a is positioned to the same track as the track just after the writing operation by the track jump as will be explained hereinlater, the read signal 200a which is sent through the head amplifier 13 is verified through the data separator 14, demodulator 15, error correction decoder 16, and the like, and the result is reported to the main controller 1.

In the case of the embodiment, the main controller 1 sets the sector in which, for instance, data errors of 10 or more bytes per sector occurred into an erroneous sector and writes the data to be written into the erroneous sector into the alternating sector.

On the other hand, when the data are read out, the interface controller 8 informs the generation of the read command of the data from the host computer H to the main controller 1. In response to the read command, the main controller 1 reads the present position information of the optical head 3 to the optical disk 100 through the head amplifier 13, data separator 14, demodulator 15, and the like and positions the optical head 3 to the address designated from the host computer H, thereby reading out the target data.

In the reading operation, after the read signal 200a transmitted from the head amplifier 13 and the like was reconstructed through the data separator 14, demodulator 15, error correction decoder 16, and the like, the signal is stored into the buffer memory 9 and is subjected to a predetermined process such that the data of the erroneous sector is replaced by the data of the alternating sector or the like. Thereafter, the processed signal is sent to the upper host computer H through the interface controller 8.

On the other hand, the control of the jumping operation of the laser spot 3a between tracks as mentioned above for the RAW operation in the recording mode is executed as shown in, for example, FIG. 4.

That is, when the main controller 1 recognizes the sector to start the jumping operation, the servo switch 5 is switched from the tracking servo circuit 4 to the side of the track jump control circuit 6 and the jump to the inner rim side by one track is instructed to the track jump control circuit 6.

After the laser spot 3a was jumped by giving the galvano mirror driving current 4a corresponding to the movement of one track from the track jump control circuit 6, the servo switch 5 is immediately returned to the inherent side of the tracking servo circuit 4. In the case of the embodiment, for instance, a time of 200μ sec is required for the switching operation. However, in the case of the embodiment, a time of at most 800μ sec is required until the tracking servo signal 4b is settled.

As mentioned above, since a desired sector passing time of the laser spot 3a of one sector is equal to 600μ sec, a ratio k of the desired time of the track jump to the sector passing time is $$k = (200 + 800)/600 \div 2$$

(the fraction is raised to a unit). A desired sector passing time of two sectors is required to complete the track jump of one track.

Therefore, in the case of the embodiment, the first track format as shown in FIGS. 1 and 2 is set for the optical disk 100.

That is, as mentioned above, since the number N of sectors which are included per track is set to 100 and the number M of inevitable alternating sectors per track is set to 1 and the desired time of the track jump is equal to the desired passing time of two sectors (k=2), the number of user's sectors (ordinary sectors) in which ordinary data is recorded is set to 97 (=N−M−k=100−1−2) and the two (>M) alternating sectors are arranged subsequent to the user's sectors.

As shown in FIG. 1, the writing operation in the first track format is executed in accordance with the following procedure.

That is, the data sent from the upper host computer H is temporarily held the buffer memory 9 (memory area A) (T₁ in the diagram).

The writing of the data in the buffer memory 9 is started from the sector #0 in the track #1 and the data of 97 sectors until the sector #96 is written (W₁ in the diagram).

In response to the detection of the address portion of the sector #97, the laser spot 3a is jumped to the inner rim side by one track by the control operation as mentioned above.

At this time, in the case of the embodiment, the desired passing time of two sectors is required for the above jumping operation. However, since the desired time of the jumping operation is provided by total two sectors of the sector #97 just after the sector #96 and the deviation of one sector in the peripheral direction in the track on the jumping side, the laser spot 3a is positioned just before the sector #99 of the preceding track and the data can be reproduced from the sector #99.

The RAW operation is executed (R₁' in the diagram) by the next rotation while tracing the recorded track #1 by the operation W₁. Discrimination is performed for a period of time when the laser spot passes through the first alternating sector (sector #97) locating just after the last user's sector. If at least one erroneous sector was detected, the data to be written into the erroneous sector is written into the sector #98 (that is, the second alternating sector).

In parallel with the above operation, the operation to store the next data from the host computer H into the memory area B in the buffer memory 9 is executed (T₂ in the diagram).

Subsequently, the data writing of T₂ is executed from the sector #99 to the sector #95 of the next track #2 (W₂ in the diagram). After completion of the writing operation, in response to the detection of the sector #96 (first alternating sector), the laser spot 3a is jumped to the inner rim side by one track. The laser spot 3a is positioned to the head of the sector #98 as the second alternating sector which was written by the RAW operation R₁'. The RAW operation for the sector #98 and the RAW operation for the writing operation W₂ are executed (R₂' in the diagram).

As mentioned above, in the case of the embodiment, 97 user's sectors and two alternating sectors are arranged for the area of 100 sectors of one track and the substantial start position of the next track is set to be sequentially deviated when it is seen from the radial direction. Therefore, if the number of erroneous sectors occurring per track is equal to one, the writing operation including the RAW operation of one track can be completed by two rotations of the optical disk 100 and a vain rotation waiting time does not occur.

On the other hand, in the reading operation, as shown in FIG. 2, a plurality of memory areas A and B in the buffer memory 9 are alternately used every track. The data of the alternating sectors which are sent subsequent to the data of the ordinary user's sectors are replaced in the buffer memory 9. The reading operations $R_1$, $R_2$, $R_3$, ... and the data transfer operations $T_1$, $T_2$, $T_3$, ... to the upper host computer H are executed in parallel. Thus, the reading operation and the transfer operation of the data of one track can be performed for a period of time corresponding to one rotation of the optical disk 100 without using the rotation waiting time.

Embodiment 2

Figure 5:
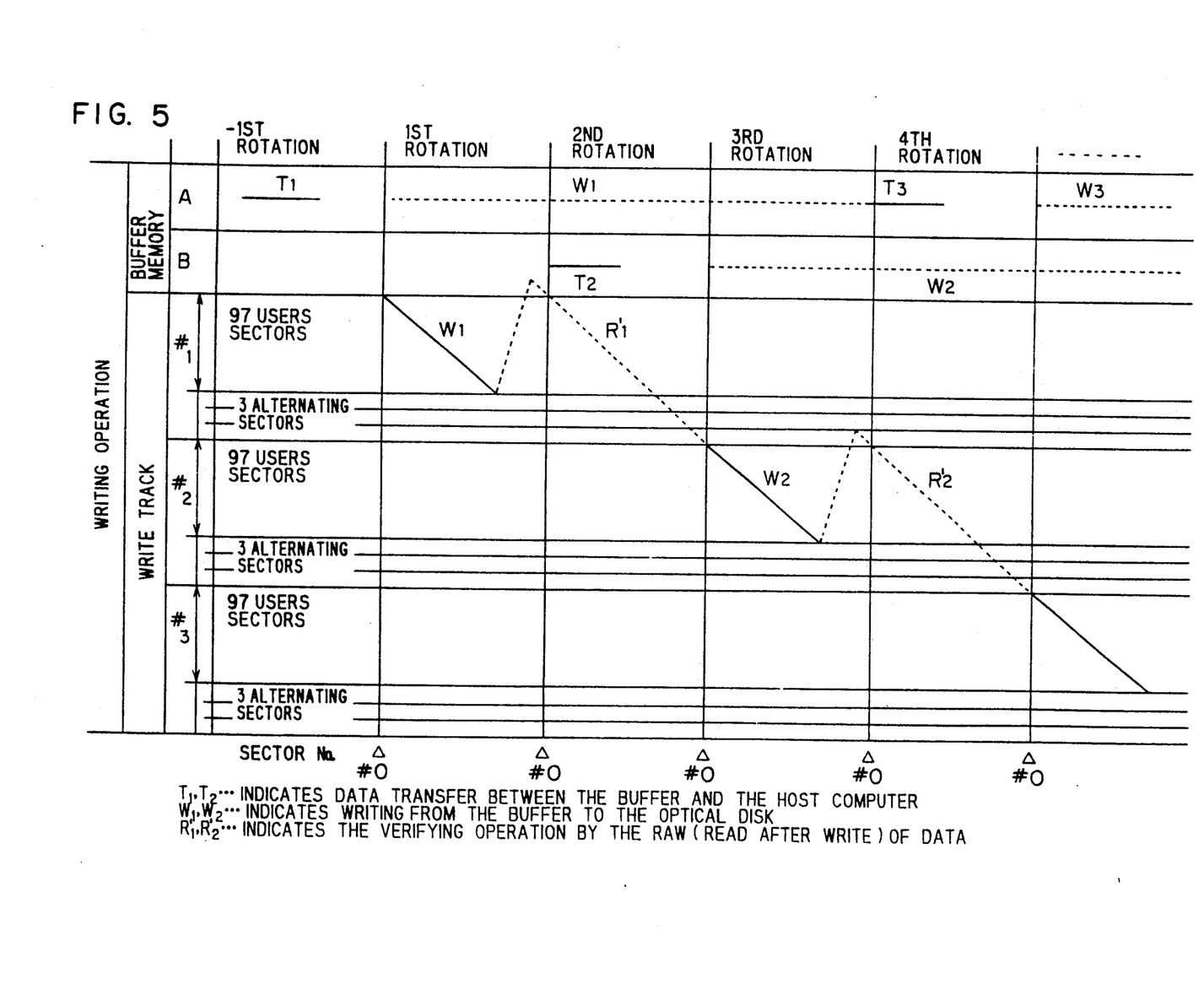
FIG. 5 is a diagram for explaining an example of the setting of the second track format in the optical disk apparatus as a second embodiment of the present invention and an example of the writing operation based on the second track format.
Figure 6:
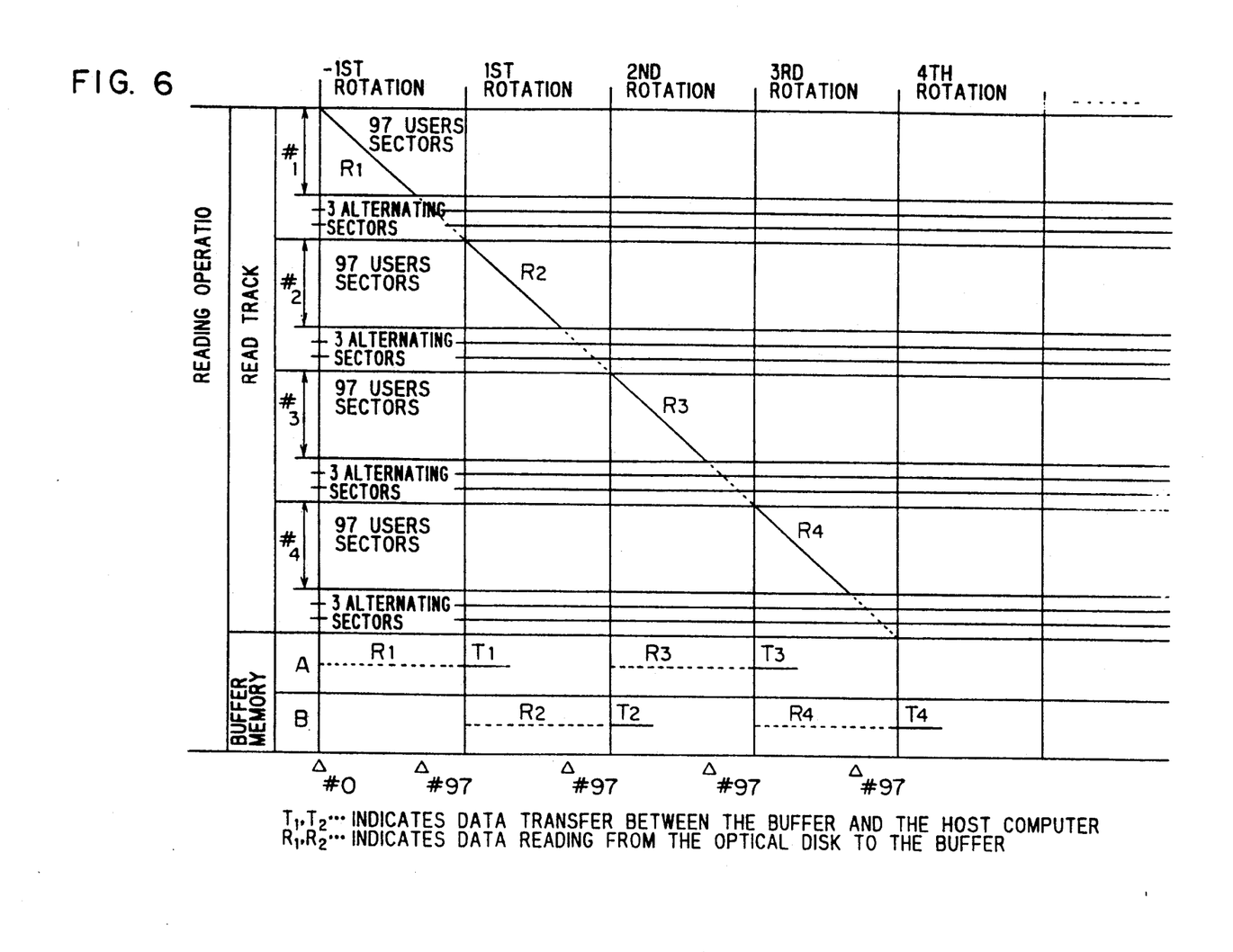
FIG. 6 is a diagram for explaining an example of the setting of the second track format in the optical disk apparatus as the second embodiment of the present invention and an example of the reading operation based on the second track format.

FIGS. 5 and 6 are explanatory diagrams for explaining an example of the setting of the second track format in an optical disk apparatus as another embodiment of the invention and the writing and reading operations based on the second track format.

In the case of this embodiment, the number N of sectors which are included per track, the least necessary number M of alternating sectors, and the ratio k of the desired time of the track jump to the desired sector passing time are set to N=100, M=1, and k=2 in the same manner as those in the case of the foregoing embodiment.

In the second track format in the embodiment, as the number of user's sectors in which ordinary data is recorded, 97 (=N−M−k=100−1−2) user's sectors are arranged. Subsequent to the 97 user's sectors, three (=M+k=1+2) alternating sectors are arranged.

With the above second track format, the data of 97 sectors from the sector #0 to the sector #96 of the track #1 is written ($W_1$ in the diagram). In response to the detection of the address portion of the sector #97 (that is, the first alternating sector), the laser spot is jumped to the inner rim side by one track. Thus, the jumping operation is completed for a period of time when the laser spot passes through the sector #97 and the next sector #98 (i.e., the second alternating sector). The laser spot is positioned just before the sector #99 (that is, the third alternating sector of the preceding track which was used to write when the erroneous sector was detected). The RAW for the sector #99 and the RAW operation $R_1'$ for the writing operation of $W_1$ can be continuously performed.

Consequently, the data recording operation including the RAW operation in one track is completed by two rotations of the optical disk 100 and the vain rotation waiting time does not occur.

On the other hand, as shown in FIG. 6, in the case of the reading operation, in a manner similar to the case of the embodiment 1, by alternating the two independent memory areas A and B in the buffer memory 9 every track, the data reading operation and the data transfer to the host computer H can be realized at a rate of one track per rotation of the optical disk 100 without using a rotation waiting time.

Embodiment 3

An embodiment in the case where the first track format shown in the embodiment 1 is applied to a recording format of the MCAV type will now be described with reference to FIGS. 7, 8A, and 8B.

Figure 7:
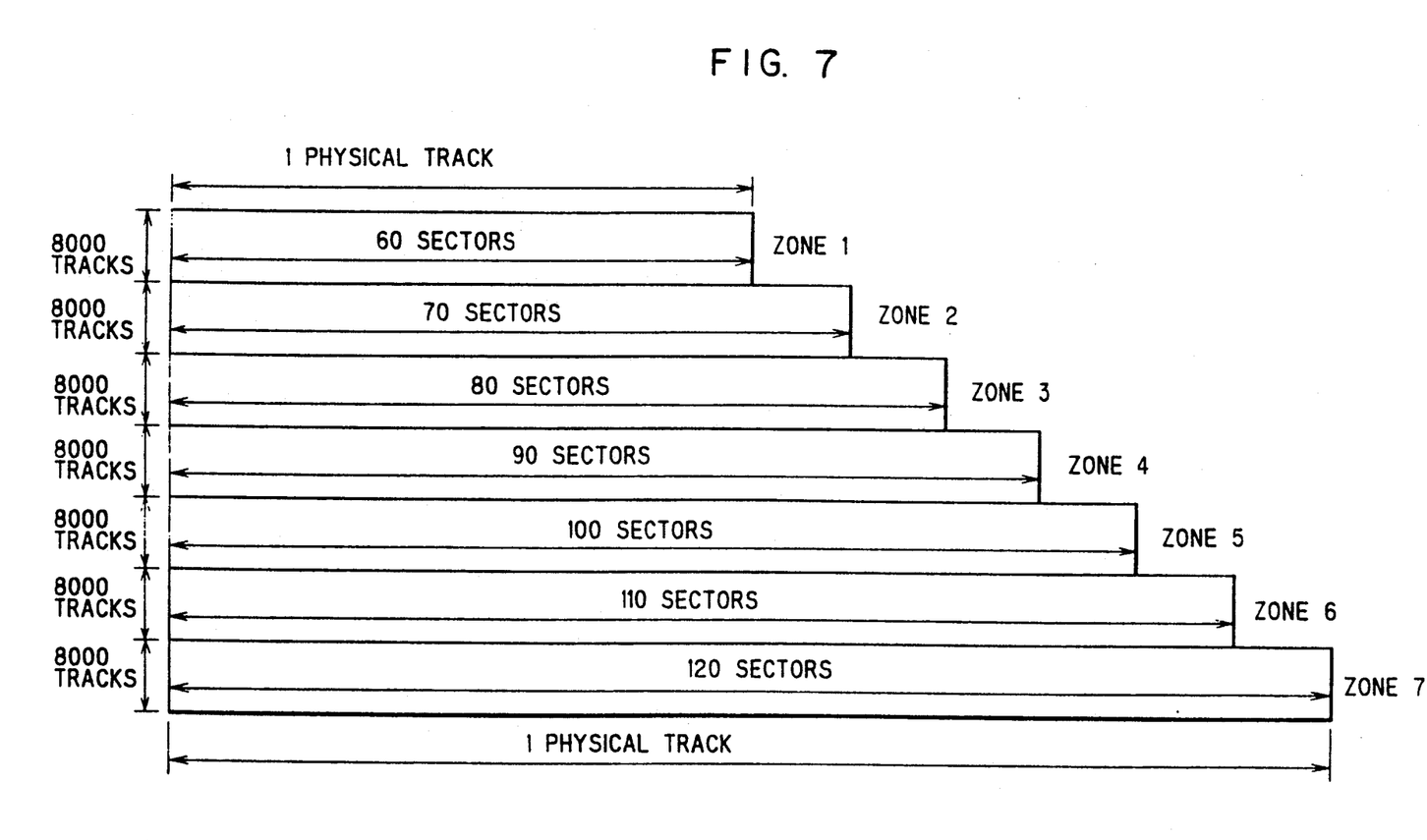
FIG. 7 is an explanatory diagram showing an example of a recording format of the MCAV type.

FIG. 7 shows an example of a recording format of the MCAV type. As shown in the diagram, a plurality of tracks are densely formed from the inner rim side to the outer rim side. A plurality of zones 1 to 7 are constructed every adjacent 8000 tracks. The numbers (N) of sectors which are included in the tracks which belong to the same zone are equalized. On the other hand, in the different zones, the numbers of sectors are gradually increased such as 60, 70, 80, 90, 100, 110 and 120 sectors in the direction from the inner rim side zone 1 to the outer rim side zone 7.

Since the rotational speed of the optical disk 100, i.e., the angular velocity is constant, for instance, assuming that a desired passing time of one sector in the innermost rim side zone 1 is set to 1 msec and a desired track jump time of one track is set to 0.7 msec, the desired passing time of one sector in each of the zones 2 to 7 and the desired track jump time (k) in the case of converting into the desired sector passing time are as shown in Table 1.

TABLE 1

| Zone | Desired sector passing time | Desired Time of track jump | Jump time of sector time unit |
|---|---|---|---|
| 1 | 1 ms | 0.7 ms | k = 1 |
| 2 | 0.85 | " | 1 |
| 3 | 0.75 | " | 1 |
| 4 | 0.66 | " | 2 |
| 5 | 0.6 | " | 2 |
| 6 | 0.54 | " | 2 |
| 7 | 0.5 | " | 2 |

Figure 8A:
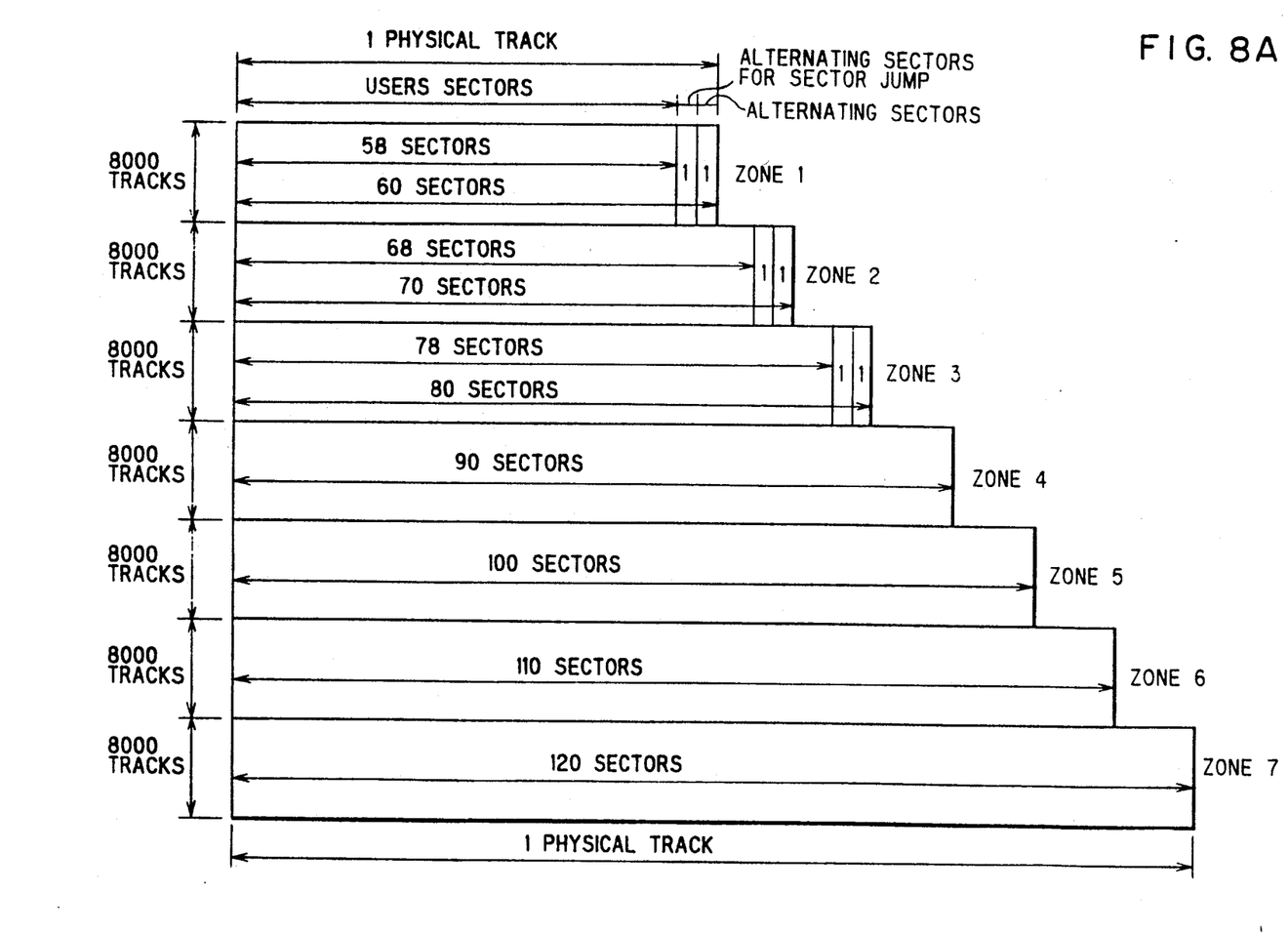
FIGS. 8A and 8B are explanatory diagrams showing an example of the setting of the first track format in the MCAV type in an optical disk apparatus as a third embodiment of the present invention.

Therefore, if the necessary minimum number (M) of alternating sectors per track is set to 1 as a countermeasure for errors in a manner similar to the cases of the embodiments 1 and 2, in the case of setting the first track format, as shown in FIG. 8A, in the zones 1, 2, and 3, the number of user's sectors is set to 58 (=N−M−k=60−1−1). Subsequent to the 58 user's sectors, total two (>M) alternating sectors of one alternating sector for jump to provide the jumping time of the laser spot and one inevitable alternating sector as a countermeasure for errors are arranged.

Figure 8B:
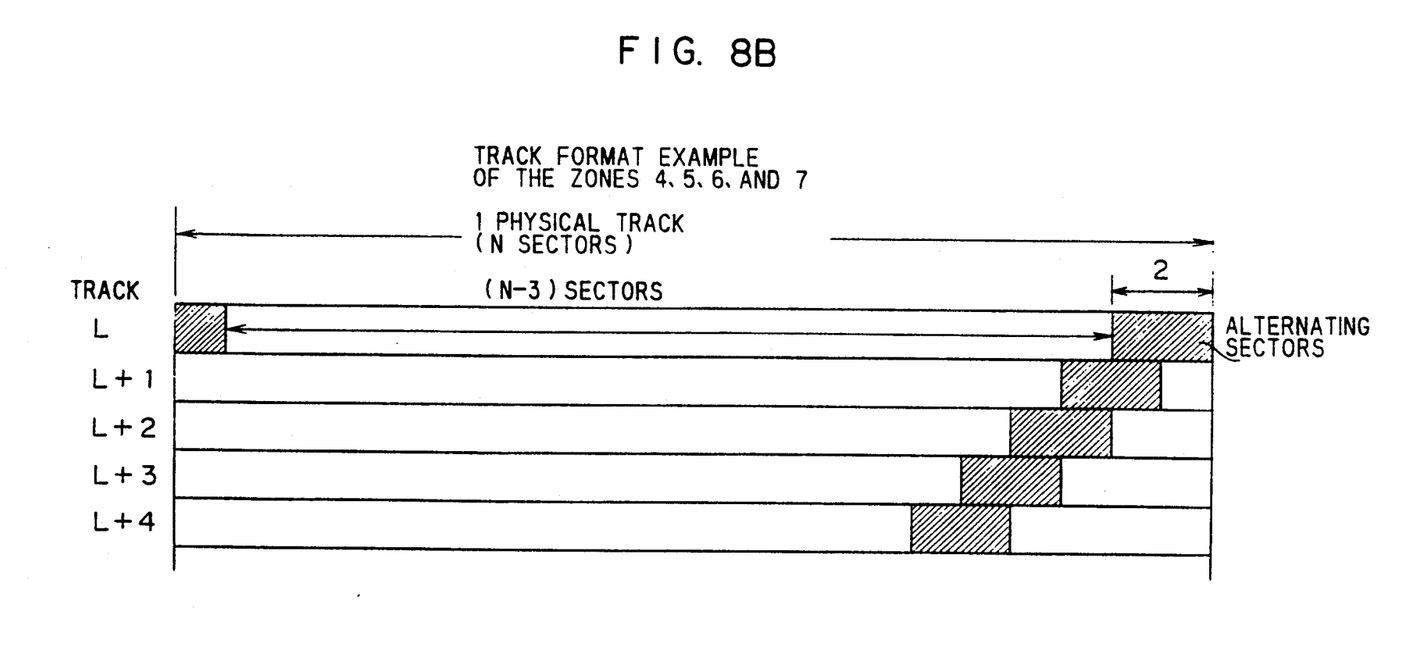

On the other hand, in the zones 4, 5, 6, and 7, track formats are as shown in FIG. 8B.

That is, in the zone 4, two (>M) alternating sectors are arranged after 87 (=N−M−k=90−1−2) user's sectors.

Similarly, in the zone 5, 97 user's sectors and two alternating sectors are continuously arranged. In the zone 6, 107 user's sectors and two alternating sectors are continuously arranged. In the zone 7, 117 user's sectors and two alternating sectors are continuously arranged.

By the setting of the first track format as mentioned above, in the zones 1 to 3 on the inner rim side, the track jump can be performed for a period of time when the laser spot passes through one alternating sector locating just after the user's sector. In the zones 4 to 7, on the other hand, a desired track jump time is provided by a desired passing time of two sectors of a passing time in one alternating sector just after the user's sector in the present track and a deviation of one sector in the peripheral direction of the head position of the track on the jumping side.

Due to this, in any one of the zones 1 to 7, after completion of the jump to the inner rim side by one track, the laser spot 3a is positioned just before the alternating sector of one track before the track in which data was written just before the track jump. The recording operation including the RAW operation of one track is completed for a period of time of two rotations of the optical disk 100. A vain rotation waiting time does not occur.

Embodiment 4

Figure 9:
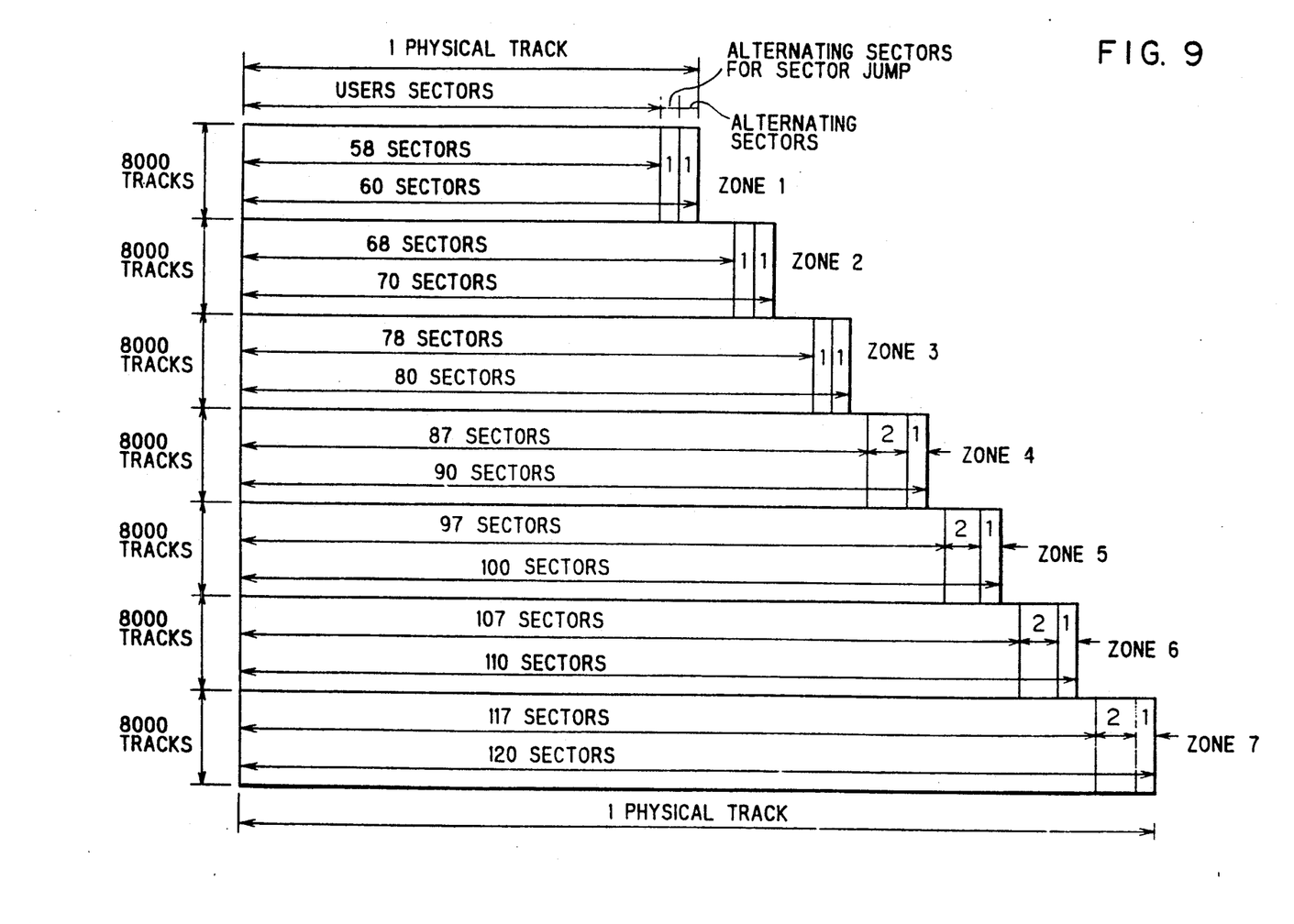
FIG. 9 is an explanatory diagram showing an example of the setting of the second track format in the MCAV type in an optical disk apparatus as a fourth embodiment of the present invention.

FIG. 9 is an explanatory diagram showing an example in the case of setting the second track format to the optical disk 100 having the recording format of the MCAV type shown as an example in FIG. 7 mentioned above.

The conditions are set to the same as those in Table 1 shown as an example in embodiment 3.

That is, in the case of the second track format, in the zones 1 to 3, two (M+k=1+1) alternating sectors are arranged just after the 58, 68, and 78 (=N−M−k=N−2) user's sectors, respectively.

In the zones 4 to 7, three (=M+k=1+2) alternating sectors are arranged just after 97, 107, and 117 (=N−M−k=N−3) user's sectors, respectively.

In the case of the second track format, in any one of the zones 1 to 7, there is no deviation of the start position of the track when it is seen from the radial direction.

By the setting of the second track format, in the zones 1 to 3, the desired track jump time is provided by the passing time of one alternating sector just after the user's sectors. Similarly, in the zones 4 to 7, the desired track jump time is provided by the passing time of two alternating sectors just after the user's sectors. Therefore, even in the track which belongs to any one of the zones, the writing operation of one track including the RAW operation is completed for a period of time of two rotations of the optical disk 100 and a vain rotation waiting time does not occur.

What is claimed is:

1. An apparatus for recording and reproducing information by irradiating a light spot to a rotatable disk-like medium on which tracks are formed in a spiral form, comprising:

means for rotating the disk-like medium at a predetermined speed, said medium having a format such that each of the tracks has a first region having a plurality of user's sectors for recording data, a second region having at least one alternating sector for recording data in place of a certain user's sector, and a third region having at least one dummy sector without recording data, the format forming a plurality of zones, each of which includes a plurality of tracks so that the numbers of sectors included respectively in the first, second and third regions are constant in the same zone, and the number of the user's sectors included in the first region within each zone increases from an innermost zone to an outermost zone, the number of the dummy sectors included in the third region within the outermost zone being larger than that within the innermost zone so that the light spot is able to move between adjacent tracks within a rotating time of the disk-like medium corresponding to the third region subsequent to the first region; and means for moving the light spot in the radial direction of the disk-like medium.

2. An apparatus according to claim 1, further having:

means for writing information by positioning the light spot to a certain track;

means for sequentially reading the written information from the head sector of the track to which the light spot was moved and positioned;

means for checking whether any error exists in the information which was read out or not on a sector unit basis; and means for writing information of a certain sector among the user's sectors, where it is determined that error correction is impossible as a result of the check by the checking means, into the alternating sector of the relevant track.

3. A method of recording and reproducing information by irradiating a light spot to/from a rotatable disk medium on which tracks are formed in a spiral form, comprising the steps of:

rotating the disk medium at a predetermined speed, the medium having a format such that each of the tracks has a first region having a plurality of user's sectors for recording data, a second region having at least one alternating sector for recording data in place of a certain user's sector, and a third region having at least one dummy sector without recording data, the format forming a plurality of zones, each of which includes a plurality of tracks so that the numbers of sectors included respectively in the first, second and third regions are constant in the same zone, and the number of the user's sectors included in the first region within each zone increases from an innermost zone to an outermost zone, the number of the dummy sectors included in the third region within the outermost zone being larger than that within the innermost zone so that the light spot is able to move between adjacent tracks within a rotating time of the disk medium corresponding to the third region subsequent to the first region;

positioning the light spot to a certain track and recording data in the first region of said tracks; and moving the light spot between adjacent tracks within said rotating time of the disk medium.

4. A method according to claim 3, further having the steps of:

reading the data recorded in the first region of a certain track on a sector unit basis;

checking on a sector unit basis to see if the data which was read out has any error or not and to see if the error can be corrected or not; and recording correct data corresponding to the data recorded in a checked sector into the second region if any data having uncorrectable error exists as a result of the check.

5. A method according to claim 4, wherein said reading step is executed just after the data was recorded to said track and the light spot was moved.

6. A method according to claim 3, further having the steps of positioning and guiding the light spot to the track toward the inner rim side or the outer rim side of the disk medium, and wherein said moving step of the light spot, the light spot is jumped from a certain track to one inside track therefrom.

7. A rotatable disk medium having a format in which information is recorded by irradiating an optical beam, wherein the format has a number of tracks spirally formed with different given track addresses, each track having a plurality of sectors with different given sector addresses, and each track has a first region having a plurality of user's sectors for recording data, a second region having at least one alternating sector for recording data in place of a certain user's sector, and a third region having at least one dummy sector without recording data, and wherein the format forms a plurality of zones, each of which includes a plurality of said tracks so that the numbers of sectors included respectively in the first, second and third regions are constant in the same zone, the number of the user's sectors included in the first region within each zone increases from an innermost zone to an outermost zone, and the number of dummy sectors included in the third region within the outermost zone being larger than that within the innermost zone so that the light spot is able to move between adjacent tracks within a rotating time of the disk medium corresponding to the third region subsequent to the first region.

8. A disk medium according to claim 7, wherein each track, the third region is positioned after the first region and the second region is positioned after the third region with respect to the forming direction of the spiral tracks.

* * * * *

UNITED STATES PATENT AND TRADEMARK OFFICE
CERTIFICATE OF CORRECTION

PATENT NO. : 5,077,715

DATED : December 31, 1991

INVENTOR(S) : Takuya Mizokami, et al

It is certified that error appears in the above-identified patent and that said Letters Patent is hereby corrected as shown below:

Col. 1, line 65, After "transfer of" delete "on".

Col. 2, line 52, After "such" insert --that--.
       line 64, Change "provide" to --provides--.

Col. 3, line 6, After "providing" delete ",".

Col. 4, line 36, After "ment" delete "1".

Col. 12, line 63, After "wherein" insert --in--.

Col. 14, line 10, After "wherein" insert --in--.

Signed and Sealed this

Eighth Day of June, 1993

Attest:

MICHAEL K. KIRK

Attesting Officer

Acting Commissioner of Patents and Trademarks